United States Patent Office 3,717,812
Patented Feb. 20, 1973

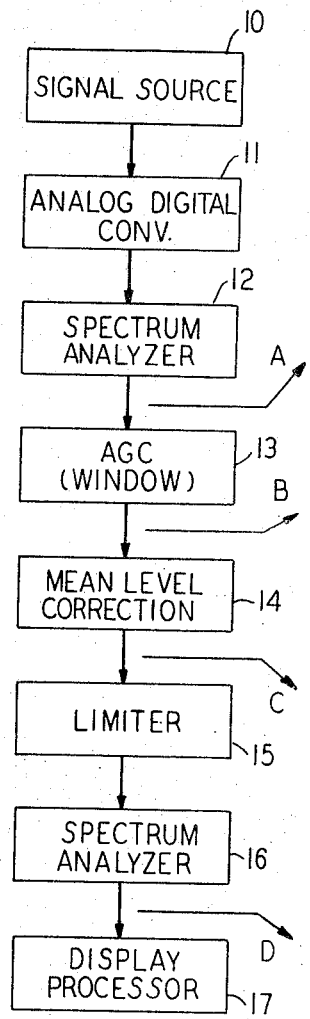
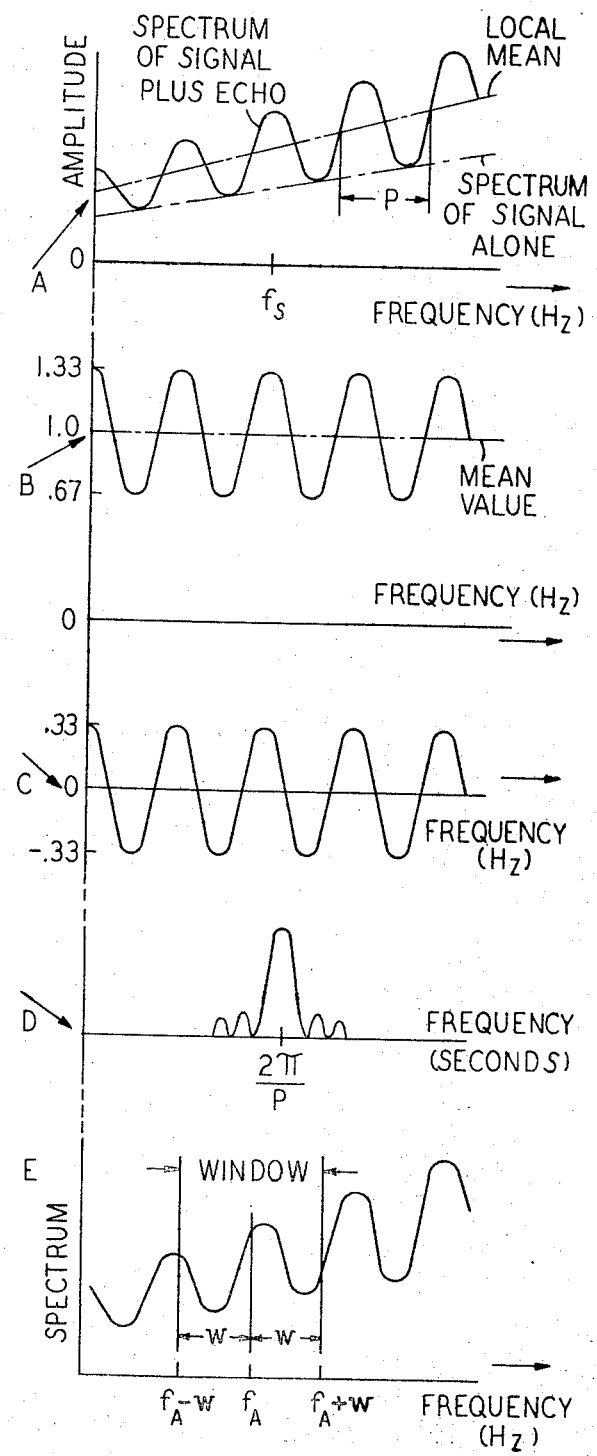
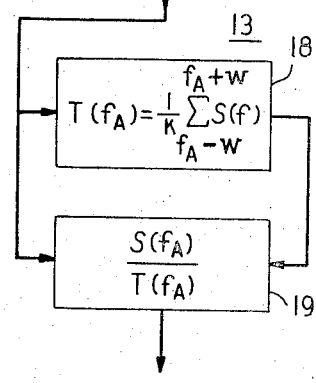

3,717,812
REAL TIME ANALYSIS OF WAVES
Peter Hirsch, Parsippany, N.J., assignor to Bell Telephone Laboratories, Incorporated, Berkeley Heights, N.J.
Filed Feb. 19, 1971, Ser. No. 116,885
Int. Cl. G01r 23/16
U.S. Cl. 324—77 B 8 Claims

ABSTRACT OF THE DISCLOSURE

Deficiencies, both functional and computational, in the detection and measurement of echoes in a time series function by means of a cepstrum operation are largely overcome by replacing the logarithmic stage of the cepstrum analyzer by a more ideal compressor function. According to the invention, spectrum ripple components are made independent of the spectrum level by dividing each point in the spectrum by an estimate of the local mean, and the effect of strong periodicities in the time series are reduced by spectral limiting. Finally, the spectrum of the mean-corrected, limited spectrum is developed to yield peaks representative of echoes. Advantageously (and unlike the log operation of the cepstrum), processing may be carried out economically on a computer.

Government Contract

The invention herein claimed was made in the course of or under a contract with the Department of the Navy.

This invention relates to signal processing and in particular to the processing of a signal to determine periodicities in its spectrum, for example, caused by an echo of the signal. It has for its principal object an improvement in the identification of an echo in a signal by means which are computationally efficient.

BACKGROUND OF THE INVENTION

A variety of techniques have been proposed for detecting the presence of echoes in seismic or ocean signals or in continuous functions such as speech signals. One of the most promising of these is the so-called "cepstrum" technique described, for example, by A. Michael Noll in "Cepstrum Pitch Determination," The Journal of the Acoustical Society of America, February 1967, pp. 293–309. The cepstrum is a coined phrase which denotes the spectrum of the logarithm of the spectrum of a signal. It is characterized by a peak at a point on the time scale which denotes the time of occurrence of an echo in the signal. Cepstrum analysis is useful generally in signal analysis and particularly in speech analysis.

Despite its wide popularity and numerous advantages, the cepstrum does have some disadvantages. For example, spurious cepstral peaks may be generated in the analysis of signals which have in their spectra large amplitude ripples or a number of strong peaks. Furthermore, the logarithm operation may remove all traces of small amplitude ripples superimposed on a high amplitude spectrum. The most serious deficiency of the cepstrum technique, however, is the cumbersome manner in which it must be implemented on a computer. Computation of the logarithm operation requires considerable storage or considerable processing time, unless severe limiting is used. Typically, a computation is made of the logarithm of each spectrum point in real time, for example, by means of a look-up procedure or the like. Even such an operation requires considerable storage capability in the computer system and involves complex computation.

SUMMARY OF THE INVENTION

In accordance with the invention, the deficiencies of the cepstrum analysis arrangements are overcome by eliminating the need for a logarithm operation. The log operation, characteristic of a cepstrum system, is replaced by a more ideal compressor function. Spectral ripples are made independent of the spectrum level by dividing each point in the spectrum by an estimate of the local mean value of the spectrum. An AGC system with an appropriate weighted window function aids in this operation. The resulting AGC'd spectrum is then reduced by its mean value and the resultant is limited. The spectrum of resulting limited, equalized spectrum exhibits cepstrum-like peaks which indicate the presence and location of echoes. Advantageously the AGC window operation, mean level correction operation and limiting may all be implemented simply and directly on a computer with great efficiency.

BRIEF DESCRIPTION OF THE DRAWINGS

The invention will be more fully apprehended from the detailed description which follows taken in connection with the accompanying drawings.

FIG. 1 is a block schematic diagram which illustrates the individual operations employed in the practice of the invention to detect the presence of echoes in a time series;

FIG. 2 is a series of drawings which illustrate signal waveforms at various points in the processing of signals in the apparatus of FIG. 1;

FIG. 3 is a block diagram illustrative of the AGC window operation employed in the processor of FIG. 1.

DETAILED DESCRIPTION

Figure 4:
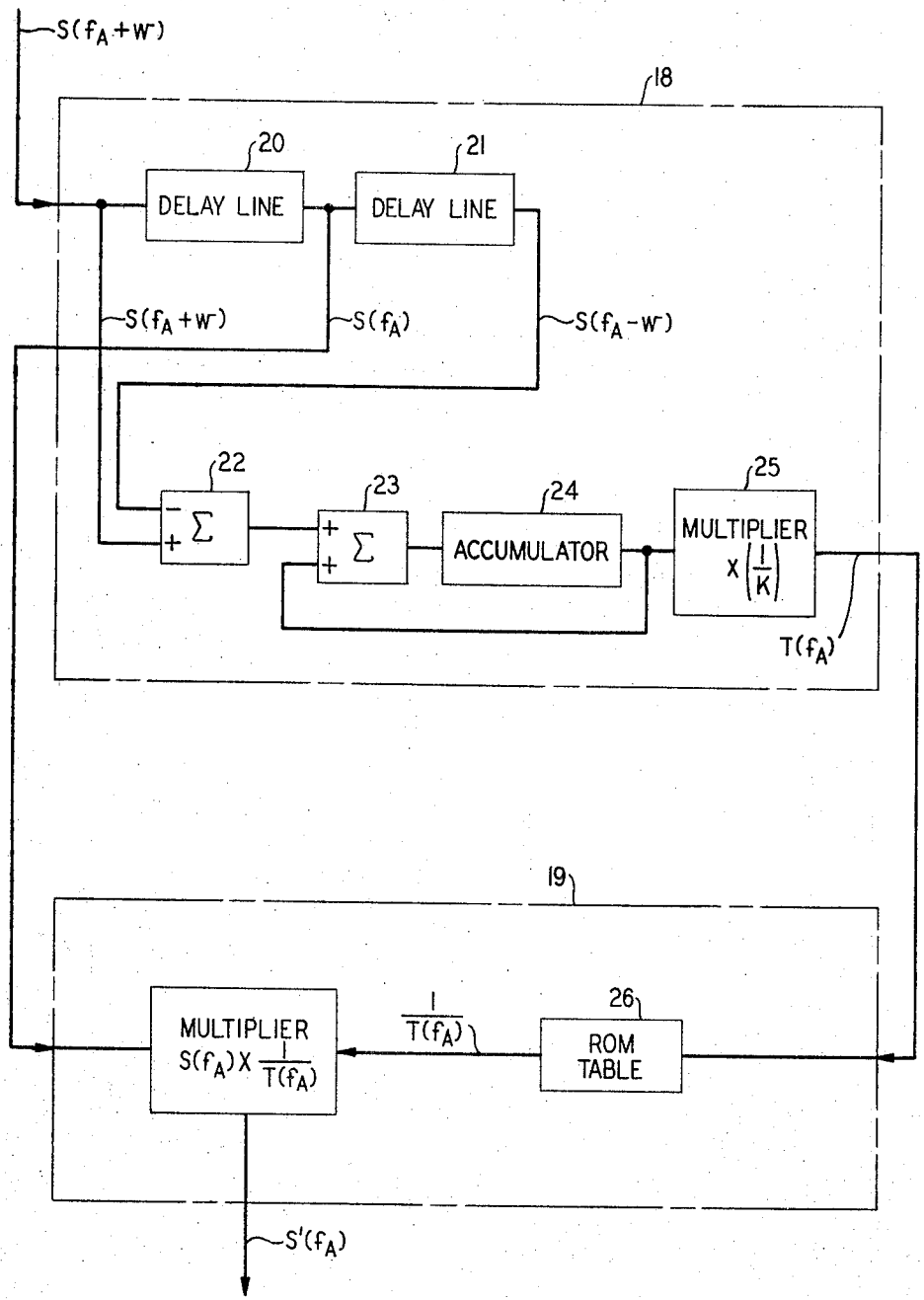
FIG. 4 is a block diagram illustrative of an alternate embodiment of the AGC window operation employed in the processor of FIG. 1.

FIG. 1 illustrates in block schematic form the essential steps in detecting the presence of echoes in a time series. Although described in terms of discrete hardware elements, it will be obvious to those skilled in the art that all of the apparatus elements may be efficiently implemented for processing on a general purpose digital computer. No unusual programming techniques are involved; indeed, routine programming in accordance with well established principles is all that is required. Yet, despite this programming simplicity, the invention, however implemented, overcomes a major deficiency in prior art techniques, namely, the implementation of a real time logarithm computation for points in the spectrum of a signal.

In the apparatus of FIG. 1, a signal originating, for example in source 10 and typically in the form of a time series of events, is applied by way of analog-to-digital converter 11 to spectrum analyzer 12. Analog-to-digital converter 11 may be of any desired construction, for example, such as described by Herman Schmit in an article entitled "Shrink A/D Conversion Costs," Electronic Design, Vol. 25, Nov. 8, 1966, page 96. Analyzer 12 may comprise a spectrum analyzer such as described in B. P. Bogert et al. U.S. Pat. No. 3,428,893, issued Feb. 18, 1969. It develops a signal representative of the spectrum of the applied signal as a function of frequency. A typical spectrum is illustrated in FIG. 2A. In this example, it is assumed that the applied signal contains an echo in its time series and has a spectrum which increases with frequency. In the figure this is the straight line labeled "Spectrum of Signal Alone." In practice, this spectrum is often a more violent function of frequency. It is well known that the spectrum of the signal plus an echo will then have the general character of the rippled spectrum shown by the varying amplitude signal in FIG. 2A and that the amplitude of the ripple increases with that of the spectrum of the signal alone. The period of the ripple labeled "P" is known to be related in a simple manner to echo delay.

Subsequent operation, in accordance with the invention, measure this period and thereby the delay of the echo. In the simplest case, these quantities could be measured by preparing a spectrum analysis of the initial spectrum. However, this simple approach is undesirable for reasons which have to do with both the statistics of the spectrum estimation process and practical considerations such as the dynamic range of the spectrum analyzers. Accordingly, the spectrum ripple is made essentially independent of spectrum level. In a cepstrum system this is done by analyzing the logarithm of the spectrum. Yet, with such processing, the logarithmic compressor may generate harmonics of large amplitude spectral ripples which appear as spurious lines in the output display. Moreover, if there are a small number of strong peaks in the spectrum, a large number of undesirable harmonics may appear in the output display. Further, if there is a small amplitude ripple superimposed on a high amplitude spectrum, a clipped logarithm effectively removes all trace of the ripple period from the output.

All of these deficiencies are overcome in accordance with the invention by replacing the clipped logarithmic compressor with a more ideal compressor function. Accordingly, each point in the spectrum developed in unit 12, is divided by an estimate of the local mean value of the spectrum by the use of an AGC window processor 13. Window width is a compromise between two conflicting requirements: a wide window leaves unchanged the details of the ripple but gives a poor estimate of the local mean at each point; and a very narrow window gives a good estimate of the local mean but tends to destroy the ripple. In practice, a window width is selected which is 2 to 10 times larger than the longest expected ripple period.

Typical processing for the AGC window operation is illustrated in the apparatus of FIG. 3. A specific, detailed embodiment of the apparatus described in FIG. 3 is illustrated in FIG. 4, and the result of the AGC window operation is illustrated in FIG. 2E. In FIG. 2E an AGC window about point $f_A$ is illustrated with intervals $w$ higher and lower in frequency than the spectrum value $f_A$. Counting the simple point $f_A$, the window width is then $2w+v$. All points in the window are then summed and scaled. Thus, the resultant is a block average taken over the window width. The spectrum point $f_A$ is then divided by this scaled average of neighboring points. Expressing the above in mathematical form, the local mean value $T(f_A)$ for the point $f_A$ is $$T(f_A) = k \sum_{f_A-w}^{f_A+w} S(f) \quad (1)$$

where $K$ is a constant selected to assure that the evaluation is within the machine capacity of the processing apparatus, and $S(f)$ are spectrum points within the window from $f_A-w$ to $f_A+w$. Further, the spectrum value $S(f_A)$ at point $f_A$ can be expressed by $$\text{Corrected Spectrum } S'(f_A) = \frac{S(f_A)}{T(f_A)} \quad (2)$$

The window is then moved by one sample point and the process repeated for the new center point and so on for the remainder of the spectrum data. The apparatus for implementing the AGC window processor is illustrated in FIG. 3 wherein the local mean value, $T(f_A)$, is computed b yconventional means in block 18, and the corrected sum, $S'(f_A)$, is computed by conventional means in block 19. FIG. 4 illustrates in detail one convenient way of implementing blocks 18 and 19. As indicated in FIG. 4, block 18 contains delay lines 20 and 21 which allow for the accumulation of spectral samples $S(f)$ from $f_{A-w}$ to $f_{A+w}$, by summer 22, by summer 23, and by accumulator 24. In addition, block 18 contains multiplier 25 which performs the multiplication of the accumulator's contents by $1/K$, thereby achieving the local mean value, $T(f_A)$. Similarly indicated in FIG. 4, block 19 performs the division necessary to yield $S'(f_A)$ by obtaining the inverse of $T(f_A)$ in the read-only memory look-up table 26, and by multiplying the spectral sample to be equalized, which appears at the output of delay line 20, with the local average inverse, $1/T(f_A)$.

The corrected spectrum $S'(f_A)$, as illustrated in FIG. 2B, now has the desirable property that ripple amplitude is uniform; yet it is not in a form suitable as the input to a practical spectrum analyzer because of the nonzero mean value. Its presence would disturb the operation of a subsequent spectrum analysis, primarily because of the limited dynamic range of most spectrum analyzers.

Thus, to accommodate a spectrum analyzer with limited dynamic range, it is in accordance with the invention to subtract the mean value from the ripple corrected spectrum. The mean value is known, of course, by virtue of the AGC operation previously described. It may be defined in terms of the window width and constant $k$ as:

$$\text{Mean Value} = 1 / \left(\frac{2w+1}{k}\right) = \frac{k}{2w+1} \quad (3)$$

Accordingly, mean level correction apparatus 14 is employed to subtract the constant mean value $k/(2w+1)$ from each point in the corrected spectrum. This subtraction is achieved by any one of a number of standard binary subtraction circuits. The resulting mean level corrected signal is illustrated in FIG. 2C.

If the original time series, from source 10, exhibits one or more strong periodicities which would produce large spikes in the spectrum, for example, a large spike at the frequency $f_s$ in FIG. 2A, it might persist despite the AGC and mean level correction operations. To make certain that the range of the corrected signal is within the dynamic range of the subsequent spectrum analysis, the corrected signal from unit 14 is passed through limiter 15 to remove all signal excursions larger than the largest expected ripple amplitude. Thus, the limiting level of unit 15 is adjusted in accordance with the nature of the signal supplied from source 10. This limiting is achieved, for example, by means of a finite length register arranged to delete all representations of values higher than a predetermined value and to substitute for each deleted representation the maximum allowable value.

The corrected and limited first spectrum signal is then supplied to spectrum analyzer 16 which, preferably, is of the same construction as that of spectrum analyzer 12. The resultant analysis, as illustrated in FIG. 2D, exhibits a strong peak at a delay given by $2\pi/P$ and is measured in seconds on the frequency scale. In large measure, this peak resembles a cepstrum peak developed by cepstrum analysis apparatus, and denotes an echo in the signal from source 10. In accordance with conventional practice, this signal may be supplied to display processor 17, for example, an oscilloscope, wherein the peak is detected and evaluted and wherein an appropriate display or record of it, in terms of the applied time series signal, is prepared for utilization. If desired, an additional AGC operation may be employed to compress the range of the output signal to fit the dynamic range of the display instrument being used.

It is apparent that all of the above-enumerated operations may readily be carried out using only state of the art techniques. Advantageously, however, the symbolic blocks of FIG. 1 are tantamount to a flow chart. A suitable program may thus easily be prepared for software implementation of the invention. When the operations of the invention are carried out on a computer, considerably less storage space is required and the speed of computation is increased over the space and time requirements for similar evaluations using prior art techniques, e.g., the cepstrum or other spectrum analysis arrangements. Moreover, since spurious components have been eliminated from the output display, the peak indication of an echo is more readily discernible.

What is claimed is:

1. In the detection of echoes in a complex signal, the combination of:
   means for developing a spectrum of an applied signal,
   means responsive to said developed spectrum for equalizing said spectrum by an estimate of the mean value thereof,
   means responsive to said equalized spectrum for removing spectrum excursions greater than the amplitude of the largest expected ripple component in said equalized spectrum to produce a corrected spectrum, and
   means responsive to said corrected spectrum for developing the spectrum of said corrected spectrum.

2. The combination as defined in claim 1, further including
   means responsive to said spectrum of said corrected spectrum for identifying peaks in said spectrum of said corrected spectrum as echoes.

3. The combination of claim 2, further including
   means responsive to said spectrum of said corrected spectrum for measuring the location in time of said identified peaks.

4. For detecting the presence and location of echoes in a complex signal, the combination of:
   means for developing a spectrum of an applied complex signal,
   means responsive to said developed spectrum for making ripple compenents in said spectrum substantially independent of spectrum level,
   means responsive to said ripple equalized spectrum for removing spectrum excursions larger than the largest expected ripple amplitude to produce a corrected spectrum,
   means responsive to said corrected spectrum for developing the spectrum of said corrected spectrum, and
   means responsive to said spectrum of said corrected spectrum for identifying the time of occurrence of a peak in said spectrum of said corrected spectrum as an echo with delay.

5. The combination of claim 4, wherein:
   said means for making ripple components substantially independent of spectrum level comprises,
   means responsive to said developed spectrum for dividing the value of each of a plurality of independent samples of said spectrum by an estimate of the local mean value of the spectrum in said sample.

6. The combination of claim 5, wherein:
   said means for making ripple components substantially independent of spectrum level comprises,
   an AGC processor responsive to said developed spectrum for obtaining local mean of samples of said spectrum within a selected window of sample points of said spectrum about a selected sample point.

7. The combination of claim 4, wherein:
   said means for removing spectrum excursions comprises,
   limiter means responsive to said ripple equalized spectrum adjusted in accordance with the largest expected ripple in said applied complex signal.

8. For the real time analysis of waves:
   means for developing a first signal representation of the spectrum of an applied signal wave,
   means for equalizing ripple components of said spectrum representation,
   means responsive to said equalized spectrum for reducing the amplitude of said spectrum representation by a constant valued signal equal to the mean value of said spectrum representation,
   means responsive to said corrected equalized spectrum for limiting the value of said spectrum representation to a selected maximum amplitude value,
   means responsive to said limited spectrum for developing a second signal representation of the spectrum of said first spectrum representation, and
   means responsive to said spectrum of said limited spectrum for developing a signal which denotes the time of occurrence of a peak in said second spectrum representation.

References Cited

UNITED STATES PATENTS 3,471,781  10/1969  Shapiro et al. _____ 324—77 B
3,566,035   2/1971  Noll _____ 324—77 X STANLEY T. KRAWCZEWICZ, Primary Examiner